(12) United States Patent
Weber et al.

(10) Patent No.: US 7,797,708 B2
(45) Date of Patent: Sep. 14, 2010

(54) SIMULATING ACTIONS ON MOCKUP BUSINESS OBJECTS

(75) Inventors: Walter Weber, Neulussheim (DE); Pragnesh B. Mistry, Bangalore (IN); Carsten Ziegler, Walldorf (DE); Stefan Baeuerle, Malsch (DE); Rolf Schulte-Rebbelmund, Heidelberg (DE); Abhay A. Tiple, Sandhausan (DE)

(73) Assignee: SAP AG, Walldorf (DE)

( * ) Notice: Subject to any disclaimer, the term of this patent is extended or adjusted under 35 U.S.C. 154(b) by 1010 days.

(21) Appl. No.: 11/474,471

(22) Filed: Jun. 26, 2006

(65) Prior Publication Data

US 2008/0126409 A1 May 29, 2008

(51) Int. Cl.
*G06F 13/00* (2006.01)
(52) U.S. Cl. ..................... 719/313; 717/124
(58) Field of Classification Search ............... 719/313; 717/124
See application file for complete search history.

(56) References Cited

U.S. PATENT DOCUMENTS 5,758,351 A * 5/1998 Gibson et al. ............ 707/104.1
2004/0098606 A1* 5/2004 Tan et al. .................... 713/200

OTHER PUBLICATIONS

Jia Zhang et al. "Towards Increasing Web Application Productivity". Proceedings of the ACM SAC'04, Mar. 14-17, 2004. [Retrieved online from ACM on Oct. 6, 2009].*
Mario Bochicchio, Nicola Fiore. "WARP: Web Application Rapid Prototyping". Proceedings of the ACM SAC'04, Mar. 14-17, 2004. [Retrieved online from ACM on Oct. 6, 2009].*
Bobby Woolf. "Streamline SOA Development Using Service Mocks." IBM's DeveloperWorks, Dec. 13, 2005. [Retrieved online from http://www.ibm.com/developerworks/webservices/library/ws-mocks/ on Oct. 6, 2009].*
Alexander Chaffee, William Pietri. "Unit Testing with Mock Objects." IBM's DeveloperWorks, Nov. 1, 2002. [Retrieved online from http://www.ibm.com/developerworks/webservices/library/j-mocktest.html on Oct. 6, 2009].*
Tim Mackinnon, S. Freeman, and P. Craig. "Endo-Testing: Unit Testing with Mock Objects." Presented at the eXtreme Programming and Flexible Processes in Software Engineering Conference, XP2000. [Retrieved from http://connextra.com/aboutUs/mockobjects.pdf].*
Thomas, J; Young, M.; Brown, K.; Glover, A. Java Testing Patterns. Wiley Publishing, Inc. (2004). pp. 85-110.*

* cited by examiner

*Primary Examiner*—Hyung S Sough
*Assistant Examiner*—Brian Wathen
(74) *Attorney, Agent, or Firm*—Finnegan, Henderson, Farabow, Garrett & Dunner, LLP (57) ABSTRACT

Methods and apparatus, including computer program products, are provided for simulating business object behavior with a mockup object. In one exemplary embodiment, the method may include receiving a name of the mockup object for which to perform a specified action on, wherein the mockup object comprises one or more nodes, and receiving the action to be performed on the mockup object. The method may also include determining whether the action can be performed on the mockup object based on a set of conditions defining the status of the mockup object, and performing the action based on the determining step.

15 Claims, 7 Drawing Sheets

SIMULATING ACTIONS ON MOCKUP BUSINESS OBJECTS

FIELD

The present invention generally relates to data processing. More particularly, the present invention relates to systems and methods for simulating actions on mockup business objects.

BACKGROUND

There is, and will continue to be, advances and changes in how enterprises conduct business. Whether these advances and changes occur through growing competition and globalization, mergers and acquisitions, or a revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, represents a self-contained, self-describing piece of application functionality that can be found and accessed by other applications. A service is self-contained because the application using the service does not have to depend on anything other than the service itself, and self-describing because all the information on how to use the service can be obtained from the service itself. The descriptions are centrally stored and accessible through standard mechanisms.

Instead of requiring programmers to establish and maintain links between applications, services are loosely coupled, making connections simpler and more flexible, and allowing application architects to more easily find and understand services offered by other cooperative applications. However, the problem that exists with services is that they are often designed to expose functionality of individual applications and, thus, are too limited to be efficient building blocks for enterprise-wide business processes. A solution to this shortfall has been the migration to a Service Oriented Architecture (SOA). The SOA is an open architecture middleware, which builds on the benefits of services. An example of an SOA can be found in the Enterprise Service Framework (ESF). The term "SOA" may also be used to refer to "distributed objects" architecture, such as CORBA (Common Object Request Broker Architecture) and DCOM (Distributed Component Object Model).

The SOA enables the abstraction of business objects (BO), modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications, defined as applications that compose functionality and information from existing systems to support new business processes or scenarios.

The SOA also enables the use of an enterprise services repository. The enterprise services repository stores relevant pre-existing enterprise services and makes them available to selected partners and customers. By using the enterprise services repository, these selected partners and customers can use the pre-existing enterprise services to aid in the implementation of new services and corresponding business objects. The term "business object" (BO) represents an object of significance to a business, such as a data structure including methods for generating a purchase order. An "object" refers to a software bundle of variables (e.g., data) and related methods. For example, in object-oriented programming, an object is a concrete realization (instance) of a class that consists of data and the operations associated with that data.

When services and business objects are developed, the development of other system components, such as a user interface, is delayed until the completion of the service and the corresponding business objects. As such, there is a need to improve development of creation and interaction with these mockup business objects.

SUMMARY OF THE INVENTION

The present invention provides methods and apparatus, including computer program products, for simulating actions and behavior associated with mockup business objects.

In one exemplary embodiment, there is provided a method for simulating business object behavior with a mockup object, the mockup object implemented within a framework including other objects. The method may include receiving a name of the mockup object for which to perform a specified action on, wherein the mockup object comprises one or more nodes, and receiving the action to be performed on the mockup object. The method may also include determining whether the action can be performed on the mockup object based on a set of conditions defining the status of the mockup object, and performing the action based on the determining step.

It is to be understood that both the foregoing general description and the following detailed description are exemplary and explanatory only, and are not restrictive of the invention, as described. Further features and/or variations may be provided in addition to those set forth herein. For example, the present invention may be directed to various combinations and subcombinations of the disclosed features, and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1A:
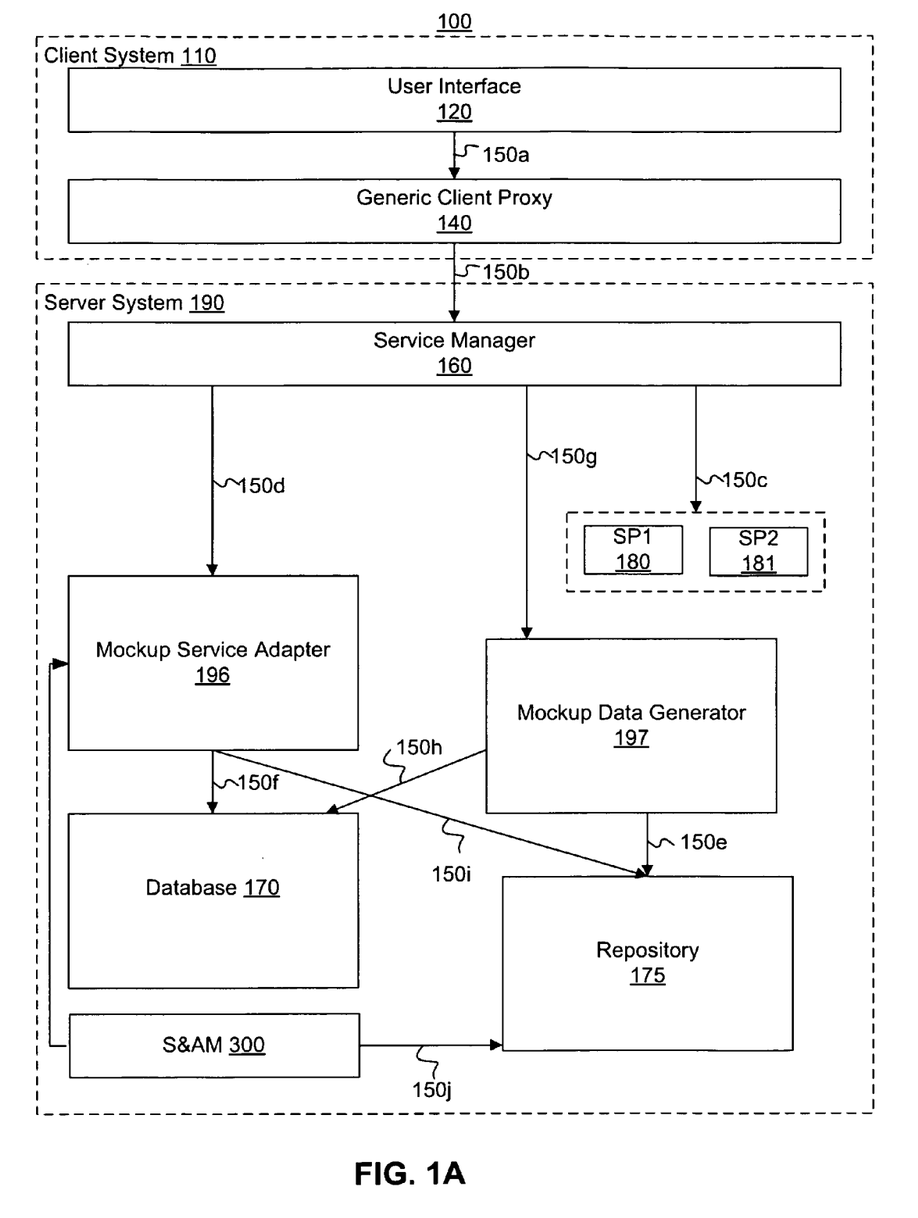
FIG. 1A illustrates a block diagram of an exemplary system environment consistent with certain aspects related to the present invention.

FIG. 1A is a block diagram of an exemplary system 100 environment that includes a client system 110 and a server system 190 for generating and simulating interaction with business objects. The business objects may serve as mockups that are stored in mockup storage for use at runtime. By providing a persistence framework for the mockup business objects, the mockup business objects can be used independently of the actual business objects, such as the business objects implemented when the development of system 100 is completed or finalized. As such, the mockup business objects that are generated allow development of components of system 100, such as the development of user interfaces, to proceed independently of, and in parallel to, the implementation of the actual business objects.

Referring to FIG. 1A, client system 110 includes a user interface (UI) 120 and a generic client proxy (GCP) 140. Client system 110 connects to server system 190 through network connection 150b. Server system 190 further includes a service manager (SM) 160, a repository 175, a mockup service adapter 196, a mockup data generator 197, a database 170, service providers 180, 181 and a status and action (S&AM) module 300. System 100 may be implemented as part of an enterprise services framework (ESF). An ESF is a type of computer framework, such as a client-server architectural framework, that includes one or more services. A framework is a system of software on one or more interconnected computers. The services are accessible to other parts of the ESF, such as client systems and their corresponding users, through a communication mechanism, such as the Internet or an Intranet. The ESF may be constructed using ESF-constructing tools Although FIG. 1A shows a single client system 110 and a single server system 190, a plurality of client systems and server systems may be used. Moreover, the components depicted in FIG. 1A may be distributed among multiple locations. Although FIG. 1A is described with respect to a client-server architecture and an ESF, system 100 can also use any other architecture or framework.

Client system 110 may include one or more processors, such as computers, to interface with server system 190. User interface 120 may provide an interface to allow a user to interact with other applications, such as service providers 180, 181 and their corresponding business objects. User interface 120 may include a browser to provide content from service providers 180, 181. In some implementations, a model-based development environment is used for generating user interface 120. User interface 120 may call the application program interface (API) of generic client proxy 140 through network connection 150a to interact, for example, with one of the service providers 180, 181.

Generic client proxy 140 may have an API implemented at client system 110 that is accessible to user interface 120. When instantiated, generic client proxy 140 may provide an interface, such as a Remote Procedure Call (RPC) or Simple Object Access Protocol (SOAP) interface, to service manager 160 at server system 190 through network connection 150b. Generic client proxy 140 may be implemented to control the functionality available to user interface 120 by providing a well-defined interface to service manager 160. For example, service manager 160 may include a variety of procedures, but generic client proxy 140 may be allowed access only to a subset of those procedures. Moreover, generic client proxy 140 may buffer requests and/or responses between user interface 120 and service manager 160.

Network connections 150a-150j may include, alone or in any suitable combination, a telephony-based network, a local area network (LAN), a wide area network (WAN), a dedicated Intranet, wireless LAN, the Internet, an Intranet, a wireless network, a bus, or any other communication mechanisms. Further, any suitable combination of wired and/or wireless components and systems may provide network connections 150a-150j. Moreover, network connections 150a-150j may be embodied using bidirectional, unidirectional, or dedicated communication links. Network connections 150a-150j may also implement standard transmission protocols, such as Transmission Control Protocol/Internet Protocol (TCP/IP), Hyper Text Transfer Protocol (HTTP), SOAP, RPC, or other protocols.

Server system 190 may include one or more processors, such as computers, to interface with other computers, such as client system 110. Generic client proxy 140 calls the API of service manager 160 at server system 190. When the API of service manager 160 is called, an instance of the service manager 160 is created at server system 190. Although service manager 160 is depicted within server system 190, service manager 160 can be located anywhere and distributed among multiple locations.

Repository 175 may store information associated with the business objects including metadata for the business objects, as well as the mockup data for the mockup business objects. For example, repository 175 may store a list of business object nodes including an identifier (ID) and mockup data content. The ID of a business object refers to an identifying memory address of a business object node that uniquely identifies individual business object nodes within repository 175. The memory address can be used to access and read data content of a particular business object node. For example, an ID of a business object node may consist of a directory structure and filename associated with the business object node. Repository 175 may be implemented as an enterprise services repository, although any other computer-readable storage medium may be used.

Repository 175 may also store metadata regarding one or more business objects. Metadata may be defined as data about data. For example, metadata may refer to information about the data itself, such as content, quality, condition, origin, size, formatting, characteristics of data, and the like. The eXtensible Markup Language (XML) is a specific example of metadata because it is a format used to define other data objects. Metadata may include a schema. A schema is the organization or structure, such as the organization of a database or the structure of an object in an object-oriented program. In object-oriented programming, modeling (i.e., the analysis of objects that are used in a business or other context and the identification of the relationships among these data objects) leads to a schema, which can be stored in repository 175 as a schema. The schema can be depicted visually as a structure or a formal text-oriented description (e.g., script). For example, metadata may be in the form of database tables. The metadata may include information, such as the number of nodes in a business object, the name(s) of the nodes, the position of a node in the business object hierarchy, the structure of a node, associations, actions, and default queries on a node.

Repository 175 may also store the mockup data associated with the mockup business objects. The mockup data is generated by the mockup data generator 197, as described further below.

Service providers 180 and 181 may each be implemented as a program accessible through a network, such as the internet. Service providers 180 and 181 may be implemented as a service, such as a web service. Although service provider 180-181 is depicted as included within server 190, service providers 180 and 181 may each be implemented at any other computer.

S&AM module 300 is a program that interprets S&AM models. This may be a direct part of the system where the mockup service adapter 196 is running. S&AM may be called through some service provider by a user through user interface 120 to simulate business object behavior and, in response, determine whether it is possible to simulate the business object behavior. S&AM module 300 is described further below.

Figure 1B:
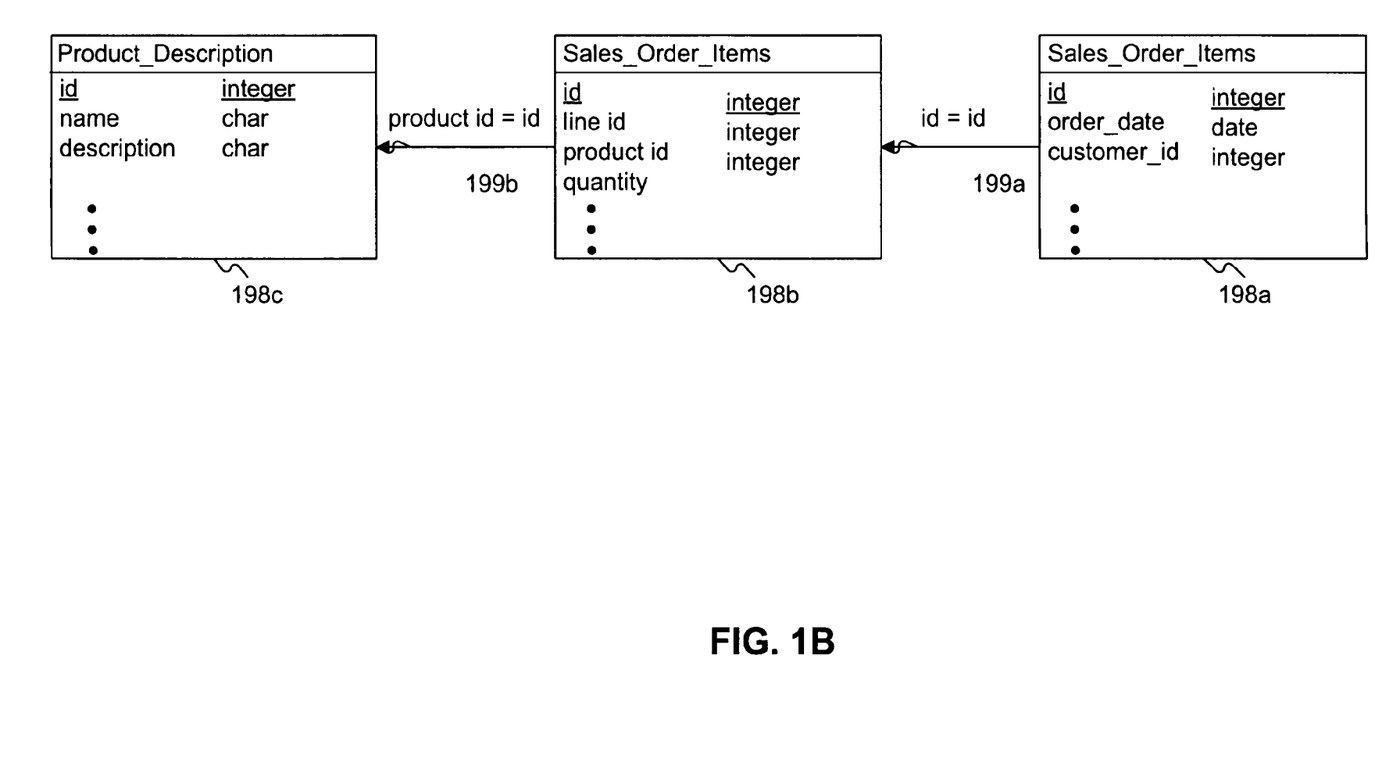
FIG. 1B illustrates an exemplary schema consistent with certain aspects related to the present invention.

FIG. 1B depicts an example schema for business object nodes stored at repository 175. The schema includes a business object node for a sales order 198a (called "SalesOrderItems" in FIG. 1B), sales order items 198b included with sales order 198a, and the corresponding product description 198c. Moreover, the schema depicted in FIG. 1B may include keys 199 that identify the relationships among the business object nodes 198. For example, key 197a is a sales order identification value ("id") that is used to link business object nodes 198a and 198b. Key 197b links the product identification values (labeled at FIG. 1B as "product id") of sales order item 198b to the product identification value (labeled "id") of product description 198c. The schema, which depicts business object nodes and how they are associated to one another, may be considered metadata and stored in repository 175. Moreover, the schema may be considered a "model" of how to implement these business object nodes. The model may serve as a template to enable the composition of other models for business objects and their nodes. The models may also be used to generate script for generating code for the business objects and their nodes. The schema may be stored as metadata in repository 175. During the final implementation of system 100, a user would interact with a service provider (e.g., to receive a product catalog) to access the business objects stored at repository 175.

Figure 2A:
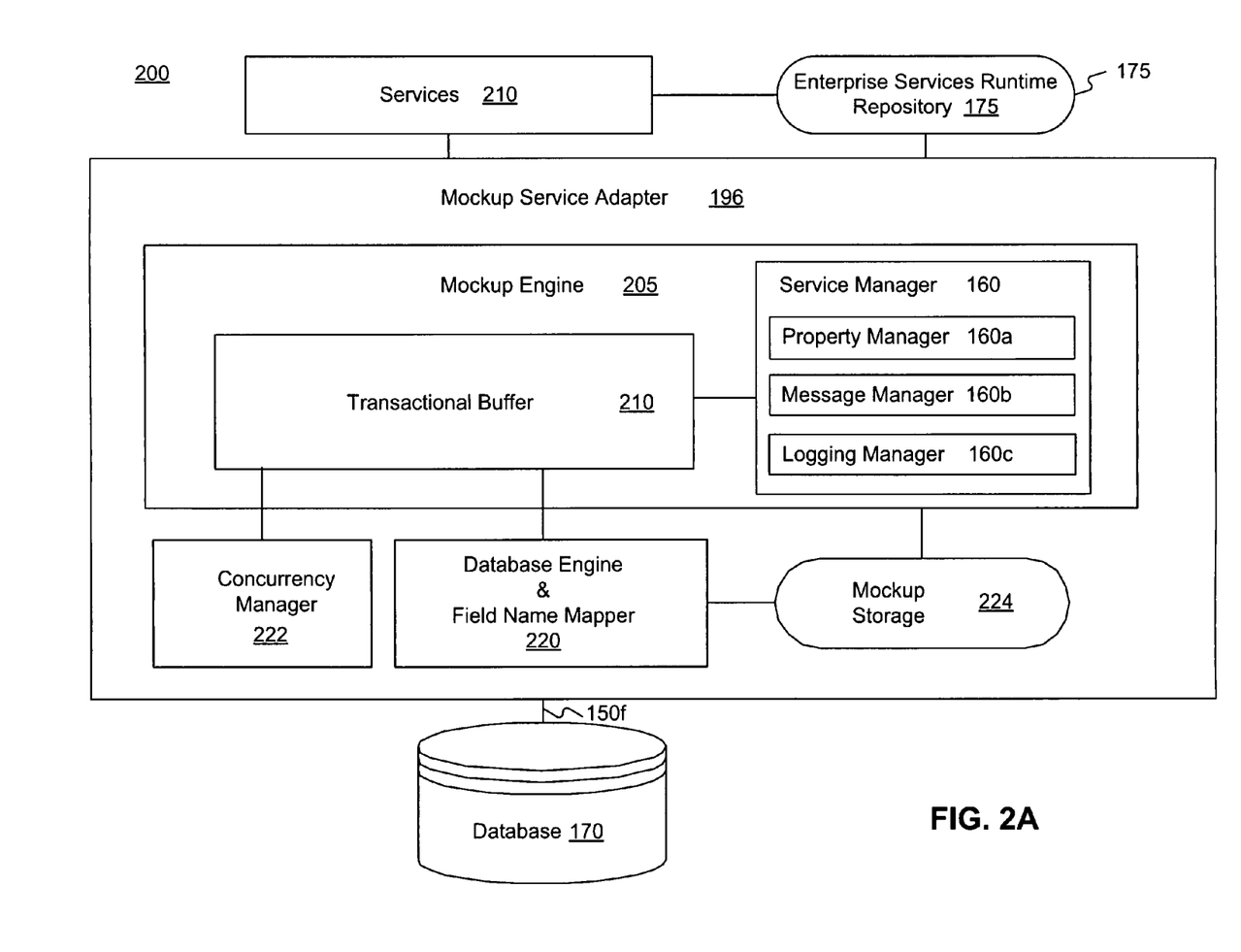
FIG. 2A illustrates a block diagram of an exemplary system at runtime consistent with certain aspects related to the present invention.

Referring to FIG. 2A, the mockup business object nodes may correspond to nodes 198. In this example, the data associated with the order date of node 198a may be stored at database 170. Mockup storage 224 may be implemented as a computer-readable storage medium (e.g., a disk drive, optical drive, and the like). Mockup storage 224 is described further below with respect to FIG. 3.

Mockup service adaptor 196 may include an API, which when called generates mockup business objects using metadata. For example, the metadata stored in repository 175 may be used to generate mockup business objects. Specifically, if the schema of FIG. 1B depicts a model of an actual business object, the model may be used to provide a similar model for generation of mockup business objects. Mockup service adaptor 196 stores any generated mockup business objects in mockup storage. At runtime, the mockup business objects are used, such that development of components of system 100 may occur independently. For example, a user interface designer can develop user interface 120 to interact with a mockup business object without regard to the actual business objects that might be used when system 100 is completed. The use of mockup business objects may thus improve system development.

FIG. 2A depicts an exemplary mockup service adapter 196. Mockup service adapter 196 may generate, based on metadata stored in repository 175, mockup business objects. Mockup service adapter 196 may also store the mockup business objects in mockup storage 224 or in repository 175. Moreover, mockup service adapter 196 may instantiate mockup business objects during runtime. Referring to FIG. 2A, when called by service manager 160, mockup service adaptor 196 calls a mockup engine 205.

Mockup engine 205 may ensure that the proper message is used to make a call to an API, such as calls to service manager 160, mockup storage 224, and other components of system 200. Mockup engine 205 may also provide a simple before-image retrieval implementation. A before-image retrieval implementation stores the state of a database before a change is made to the database.

Transactional buffer 210 manages transactional buffering, such as create, retrieve, update, delete procedures as well as other business logic (or procedures) performed on the mockup business object nodes of mockup storage 224. For example, service manager 160 may call various procedures from service providers 180-181 to instantiate a mockup business object stored at mockup storage 224 to interact with and manipulate the mockup business object nodes. These procedures may include instructions to create, retrieve, update, and delete mockup business object nodes corresponding to service providers 180-181. For example, a "create" procedure can be used to create a new mockup business object node, an "update" procedure to update data content in one or more mockup business object nodes, a "retrieve" procedure to retrieve mockup business object nodes, and a "delete" procedure to delete one or more mockup business object nodes. Moreover, procedures can be used in combination, such as a "query" procedure and a "retrieve" procedure, to search and retrieve data content from mockup business object nodes. When using the create, retrieve, update, and delete procedures, transactional buffer 205 may also implement additional procedures, such as check, save, and clean-up, as well as support change notifications to change handlers at service manager 160. Although the above description of transactional buffer 210 as performing procedures, such as create, retrieve, update, and delete, on the mockup business objects, transaction buffer may also perform the procedures on any objects.

Transactional buffer 210 may also provide the implementation of the default queries. A mockup business object node may have associated default queries on fields of a business object node. For example, each mockup business object node may have an associated database table (e.g., tables corresponding to nodes 198a-c) that includes fields and a default SQL query of those fields. Transactional buffer 210 may enable merging of database data and buffer data. For example, changes to a mockup business object node may be stored in a buffer until a save is implemented to a database. When the save is called, any changes in the buffer are written to the database, such that the changes are entered in an ordered (or phased) manner. Transactional buffer 210 may also provide the parent-child and child-parent navigation through the mockup business object nodes. For example, a mockup business object model stored at mockup storage 224 may include a schema (see, e.g., FIG. 1B) that defines a parent node (e.g., node 198a) and child node (e.g., node 198b). The parent node may be a mockup business object node for generating a sales order, and one of the child nodes may be an object of the sales order (e.g., items contained within the order and product descriptions for the items). Transactional buffer 210 may thus provide navigation between those nodes 198. Although the mockup business object node is described in connection with a sales order business object, other types of objects may be used.

Database engine and field name mapper 220 may provide access to database 170 and provide any necessary mapping functionality between proxy names and database names. The proxy names of node fields (e.g., "product id" at node 198b) may represent the ABAP (Advanced Business Application Programming) name for the node fields in an ABAP dictionary generated at the time of proxy generation of the mockup business object. When database tables for the mockup business object nodes are created using metadata, it may not be practical to create the column names of the database table with exactly the same name as the proxy names. As such, database 170 may use "pseudo" names rather than the actual proxy names used by the mockup business object nodes. Database engine 220 may also include an API that limits access to database 170. For example, only engine 220 may be aware of the actual pseudo field names used in database 170. All other components of system 200 may only know the proxy name, which is mapped by engine 220 to the actual pseudo field name at database 170. Database engine 220 may also provide a default query procedure. For example, a mockup business object node may include a predefined query to serve as a default query. As such, the default query (defined by the mockup engine) would be any query defined on the mockup business object node (or its corresponding database table).

The concurrency manager 222 provides lock management. Lock management refers to locking a mockup business object to allow accurate access to information associated with the mockup business object. For example, while a mockup business object (or its node) is being updated, it may be locked until after the update.

Service Manager 160 instance may include a message handler 160b for handling messages to and from service manager 160; a change handler 160c for handling changes affecting service providers 180-181 (e.g., changes that occur when user interface 120 changes, such as a button click, affect a service provider or the corresponding mockup business objects); and a controller 160a for controlling dynamic properties of the instance (e.g., node 198a may include data fields that are mandatory, read-only, invisible, and the like). Service manager 160 may also include a stack for storing changes associated with the change handler in a last in, first out manner. Although service manager 160 is depicted in FIG. 2A at mockup engine 205, other service manager instances may be included within system 200 including at services 210.

Moreover, when the API of service manager 160 is called by mockup service adapter 196, service manager 160 may instantiate one or more service providers 180-181 and corresponding mockup business objects.

Mockup storage 224 provides storage of mockup business objects and their business object nodes. Mockup storage 224 may also include metadata. Although mockup storage 224 may be used to store all data associated with the mockup business objects, the actual data associated with a mockup business object node may be stored in another locations, such as database 170.

Database 170 may also store the status and action schema (or model) associated with S&AM module 300. The status and action schema may contain a mapping of all the actions that a user can perform on a business object and when those actions are allowed. Each business object stored in mockup storage 224 is associated with one or more status variables, or variables. Examples of status variables are: "SalesOrderLifeCycleStatus" that describes if the status is "new", "in process" or "completed." Each BO node (and S&AM Schema) can contain multiple status variables. Another example could be an ApprovalStatus (with values "initial", "in approval," "Approved," "rejected") or an ReleaseStatus (with values "not released", "released").

The status variables are also defined as attributes at the BO node (as all the other attributes) and the values are stored in the same database 170 together with the other attributes of the nodes.

Status variables may be used to determine whether a specific action can be performed on the business object. The status and action schema may contain conditions to be met for each action before a specific action can be performed on the business object. For example, before a user can perform a "confirmInvoice" action to confirm an invoice of a business object such as a sales order business object named "SBSalesOrder3", the schema may specify any specific status that must be set to allow the "confirmInvoice" action to proceed. The schema may specify the following status: that (1) the "SalesOrderLifeCycleStatus" (e.g., order status) of the business object must be "in Process" (e.g., already being processed) and (2) the "AvailableToPromiseConfirmationStatus" (e.g., whether enough supply exists to ship) be set to "confirmed" before the "confirmInvoice" command can be performed on the business object "SBSalesOrder3." If these conditions are met, then the action "ConfirmInvoice" can be performed on the business object "SBSalesOrder3." Once an action is performed, then the status and action schema may also specify a change to another status variable associated with the business object the action was performed on. For example, once the "confirmInvoice" action is performed, the status and action schema may specify that the "InvoiceStatus" be changed to "confirmed." The status and action schema is described further with regard to FIGS. 4 and 5.

Services 210 represent applications (e.g., service providers 180-181, services, web services, and the like) that are available for calling to and from mockup service adaptor 196. For example, the create, update, retrieve, delete procedures described above may be accessible at service 210 as a service available to the framework of system 200.

Figure 2B:
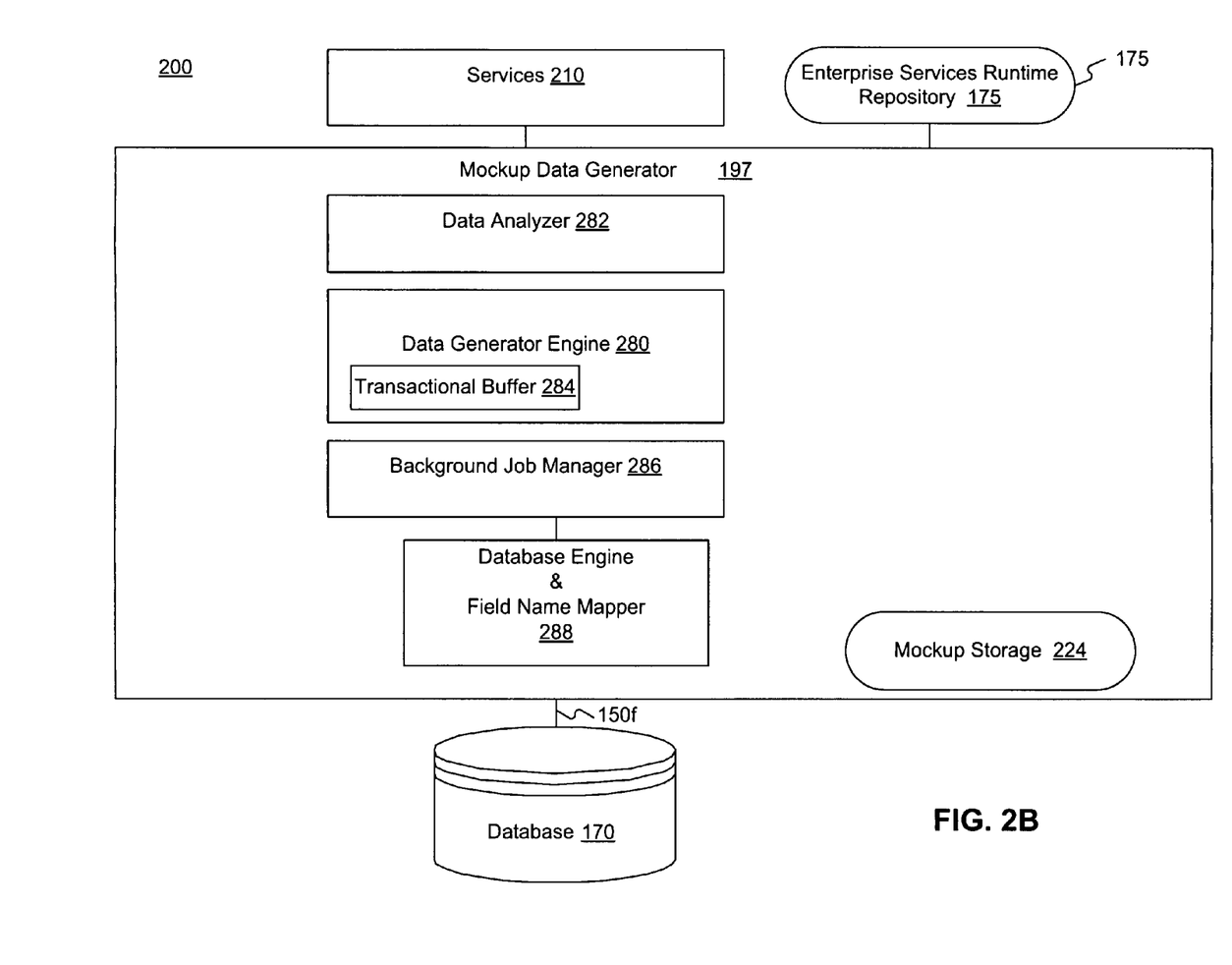
FIG. 2B illustrates another block diagram of an exemplary system at runtime consistent with certain aspects related to the present invention.

FIG. 2B depicts an exemplary mockup data generator 197. Referring to FIG. 2B mockup data generator 197 may include an API, which when called generates mockup data for the mockup business objects using user responses and metadata. For example, the metadata stored in repository 175 may be used to generate the mockup data. Mockup data generator 197 stores any generated mockup data in mockup storage 224. At runtime, the mockup business objects with the mockup data are used, such that development of components of system 100 may occur independently. For example, a user interface designer can develop user interface 120 to interact with a mockup business object containing the mockup data without regard to the actual business object data that might be used when system 100 is completed.

Mockup data generator 197 may generate, based on metadata stored in repository 175 and user responses, mockup data for the mockup business objects. Mockup data generator 197 may also store the mockup data in mockup storage 224. Moreover, mockup data generator 197 may instantiate mockup data during runtime.

Mockup data generator 197 comprises of data analyzer 282, data generator engine 280, and background job manager 286. Data analyzer 282 allows a user to specify a range of values for the creation of the mockup data. For example, a user may specify a value set for an integer field to start from "1" to "1000." Data analyzer 282 also performs a check on the values specified by the user for a specified field to determine whether the field is valid.

Data generator engine 280 may be called by mockup data generator 197 to generate mockup data for the mockup business objects. The mockup data is generated independently of any actual data. For example, based on the business object metadata stored in mockup storage 224, as well as the user input, generator engine 280 creates mockup data for the mockup business object nodes and stores the resulting mockup data in mockup business object nodes in mockup storage 224. The tables may have technical names, such as "sales order," "sales order items," and "product description." Data generator engine 280 maps these technical names to an appropriate storage mechanism, such as mockup storage 224 or database 170. The association between mockup business object nodes, database table names, and field names may be stored in mockup storage 224.

A mockup business object node may have associated default queries on fields of a business object node. For example, each mockup business object node may have an associated database table (e.g., tables corresponding to nodes 198a-c) that includes fields and a default SQL query of those fields. Transactional buffer 284 may enable merging of database data and buffer data. For example, changes to mockup data in a mockup business object node may be stored in a buffer until a save is implemented to a database. When the save is called, any changes in the buffer are written to the database 170, such that the changes are entered in an ordered (or phased) manner. Transactional buffer 284 may also provide the parent-child and child-parent navigation through the mockup business object nodes. For example, a mockup business object model stored at mockup storage 224 may include a schema (see, e.g., FIG. 1B) that defines a parent node (e.g., node 198a) and a child node (e.g., node 198b). The parent node may be a mockup business object node for generating a sales order, and one of the child nodes may be an object of the sales order (e.g., items contained within the order and product descriptions for the items). Transactional buffer 284 may thus provide navigation between those nodes 198.

Transactional buffer 284 within data generator engine 280 manages transactional buffering, such as create, retrieve, update, and delete procedures performed on the mockup business object nodes of mockup storage 224. Transactional buffer 284 may be implemented as described above with respect to transactional buffer 210.

Background job manager 286 may write all the mockup data that is stored in transactional buffer 284 to the database 170 or mockup storage 224. Background job manager 286 maintains any inconsistency in the database 170 if there is any failure during the write operation.

Database engine and field name mapper 288 may be implemented as described above with respect to database engine 220, described above.

Figure 3:
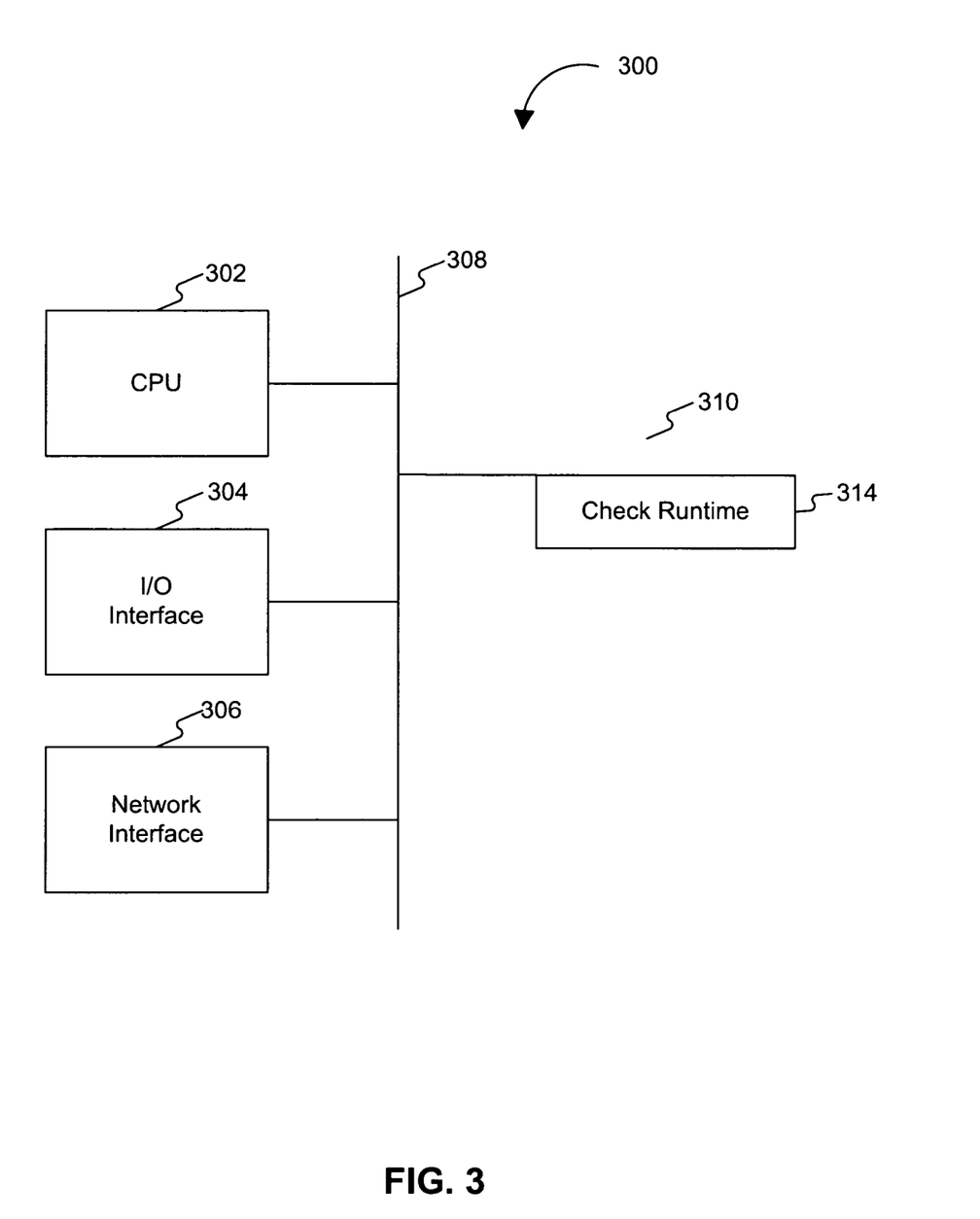
FIG. 3 is a block diagram of an exemplary status and action (S&AM) module, consistent with aspects of an embodiment of the present invention.

FIG. 3 is a block diagram of an exemplary S&AM module 300, consistent with an embodiment of the present invention. S&AM module 300 may be a computer or network of computers that may receive calls for status and action in formation for the business objects in repository 175 from user interface 120 and, in response, determines whether the action requested is possible. A status is a value or the set of values of all the parameters that define the condition of a system, subsystem, or component. An action is to carry through a command, put in effect, or carry out a task. S&AM module 300 may include at least one central processing unit (CPU) 302, an I/O interface 304, a network interface 306, and memory 310. CPU 302 may execute instructions associated with the processes contained in memory 310 and transmit results to other subsystems of S&AM module 300 over a high speed interconnect or data bus 308. I/O interface 304 is an interface that may be used to couple S&AM module 300 to devices such as a keyboard, a mouse, a display device, and any other I/O device useful in operating and managing S&AM module 300 as is understood by one of skill in the art. The network interface 306 may be used to communicate with network 150j (FIG. 1A). Although FIG. 1A depicts S&AM Module 300 as included within server system 190, S&AM Module 280 may be implemented at any other computer.

In one embodiment, memory 310 may include: check runtime process 314 that may have program instructions that, when executed, determines whether the action requested on the business object is allowed based on one or more conditions.

Figure 4:
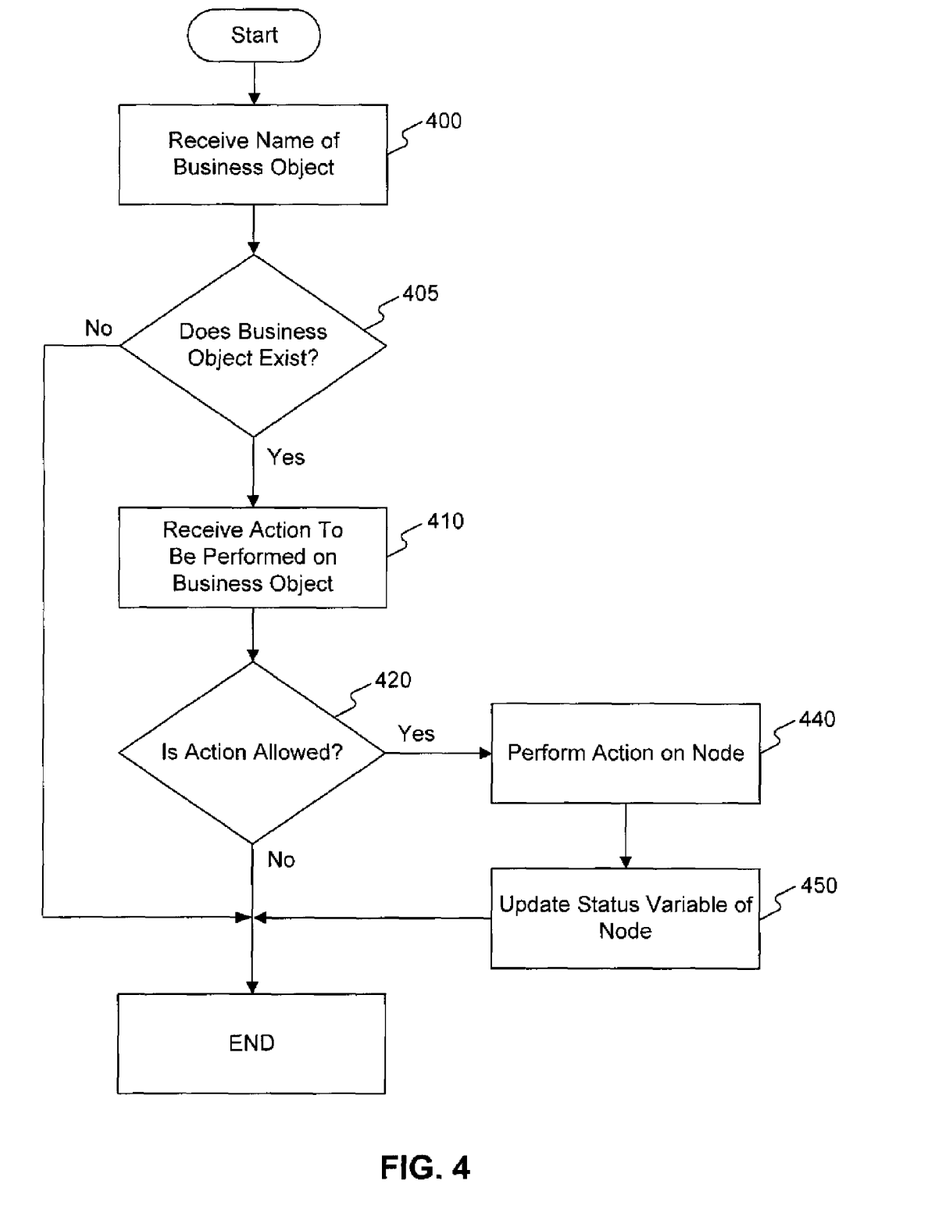
FIG. 4 is a flowchart of exemplary steps for determining whether business object behavior can be simulated for the mockup business objects consistent with certain aspects related to the present invention.

FIG. 4 is a flowchart of exemplary steps for determining whether behavior can be simulated for the mockup business objects. Mockup Service adapter 196 may first receive from a user the name of the business object for which to perform an action on (step 400). The user (e.g., a person on a computer) in this case would be specifying the name of the business object and the business object node for which the action should be performed on (e.g., confirming an order status, canceling an order status, and the like).

Mockup service adapter 196 then determines whether the specified mockup business object exists before an action is performed on that business object (step 405). For example, if the mockup business object requested by the call does not exist at mockup storage 224 or in repository 175, mockup service adapter 196 may determine that the action cannot be performed.

The user may then provide the action to be performed on the business object (step 410). For example, the user may specify to perform a "confirm" action on the "SBSalesOrder3" business object. Before the mockup service adapter 196 can perform the "confirm" action on the "SBSalesOrder3," check runtime process 314 has to determine whether this action is able to be performed on the business object. Check runtime process 314 may first determine if the action is allowed by determining whether the conditions for the action are satisfied by the business object (step 420).

Check runtime process 314 may determine whether the action is associated with any conditions, as specified by the schema, described above. If the business object is associated with one or more conditions, check runtime process 314 may determine whether the status variables for the that business object allow for the action to be performed on the business object based on the conditions. If the action is allowed because the conditions have been met, mockup service adapter 196 may perform the specific action on the business object (step 440). Once the action is performed, the S&AM module 300 may update the status of the business object according to the schema (step 450). If the action is not allowed, no action is performed on the business object. This process is described further below with reference to FIG. 5.

Figure 5:
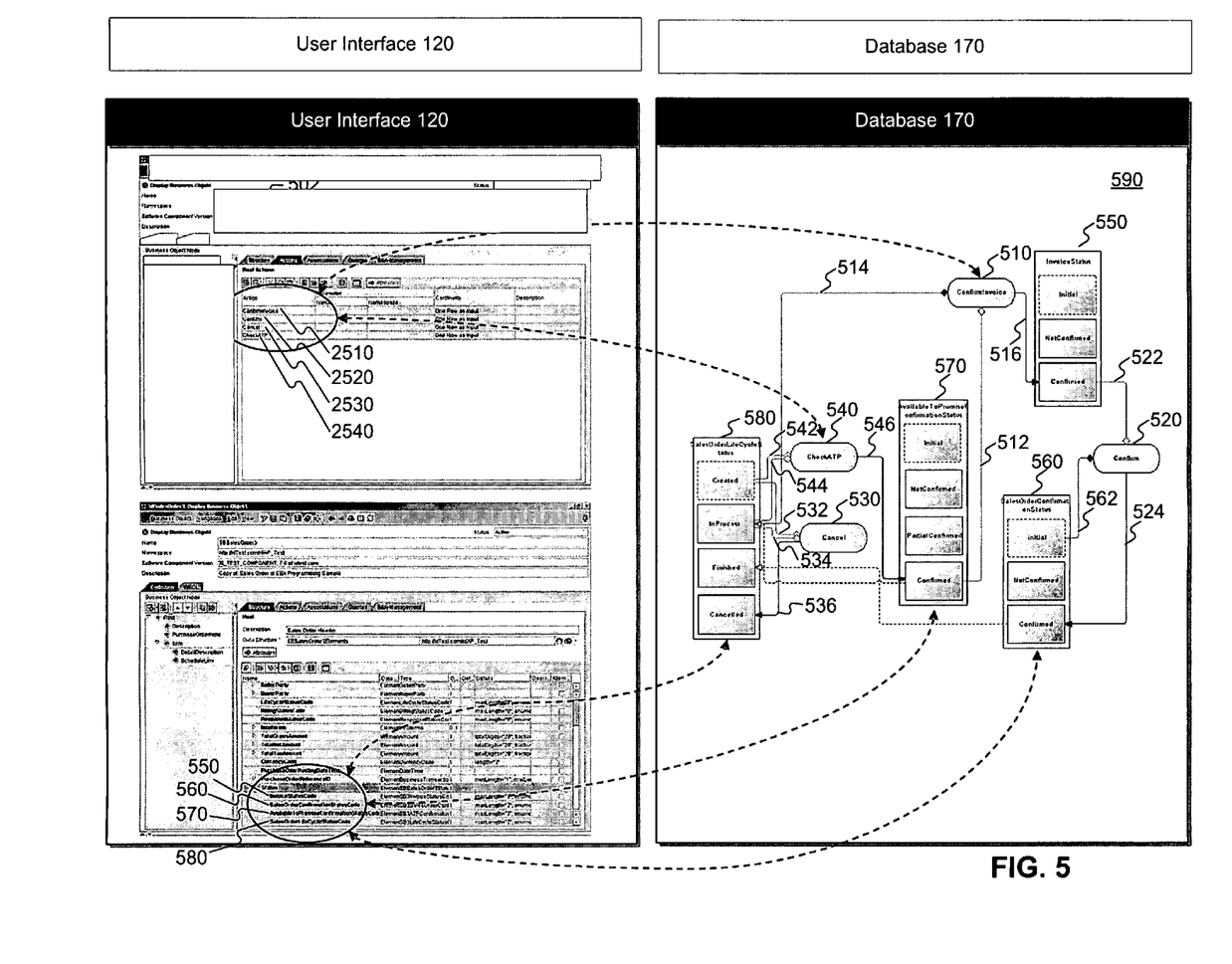
FIG. 5 illustrates another block diagram of an exemplary system at design time consistent with certain aspects related to the present invention.

FIG. 5 illustrates another block diagram of an exemplary system at design time consistent with certain aspects related to the present invention. FIG. 5 illustrates user interface 120 as well as a status and action schema 590 stored in database 170 that S&AM module 300 uses. In operation, a user may first specify the name of a business object (FIG. 4, step 400). In this scenario, the user has selected the business object "SBSalesOrder3" 502 as the business object to work with. After mockup service provider 196 receives the name of the business object, mockup service provider 196 may then receive the action to be performed on the business object (FIG. 4, step 410). Depending on what action is chosen, the schema 590 in database 170 may be associated with a set of conditions that must be met before the action can be performed.

For example, for the "ConfirmInvoice" 510 command, before that action can be performed the "SalesOrderLifeCycleStatus" 580 must be "in Process" as represented by line 514 and the "AvailableToPromiseConfirmationStatus" 570 must be set to "confirmed," as represented by line 512. For the "Confirm" 520 command to be performed on the "SBSalesOrder3" 502 business object, the "InvoiceStatus" 550 must be "confirmed" as represented by line 522 and the "SalesOrderConfirmationStatus" 560 must be "initial," as represented by line 562. For the "Cancel" 530 action to be performed on the "SBSalesOrder3" 502 business object the "SalesOrderLifeCycleStatus" 580 must be set to "Created" as represented by line 532 or be set to "InProcess" as represented by line 534. In order for the "CheckATP" 540 function to be performed on the "SBSalesOrder3" 502 business object, the "SalesOrderLifeCycleStatus" 580 must be set to either "Created" as represented by line 542 or "InProcess" as represented by line 544.

If the condition is allowed according to the conditions in the scheme (FIG. 4, step 420), then mockup service provider 196 may perform the requested action on the specified business object in the repository 175. For example, if it is a "cancel" command, then the business object is cancelled. In this case, the business object is for a sales order "SBSalesOrder3" and therefore if the conditions are met, then this sales order is cancelled. Once the action is performed, the status variable of the node of the business object is updated (cf. FIG. 4, step 450) according to the status and action schema 590.

For example, if the conditions for the action "ConfirmInvoice" 510 are met, the "InvoiceStatus" 550 is set to "confirmed" as represented by line 516. If the conditions for the "Confirm" 520 command are met, the status for "SalesOrderConfirmationStatus" 560 is set to "confirmed" as represented by line 524. If the conditions for the "Cancel" 530 command are met, then the "SalesOrderLifeCycleStatus" 580 is set to "Cancelled" as represented by line 536. Finally, if the conditions for the "CheckATP" 540 command are met, the "AvailableToPromisedConfirmationStatus" for the business object is set to "Confirmed" as represented by line 546. The status of the business objects are updated in database 170 according to the schema. Although FIG. 5 depicts status information, such as invoice status 550, sales order life cycle status 580, and the like, the status information is only exemplary, and other types of status may be used. Moreover, although FIG. 5 shows specific actions, such as cancel 530, confirm 520, and the like, actions are exemplary, and other actions may be used as well.

The systems and methods disclosed herein may be embodied in various forms, including, for example, a data processor, such as a computer that also includes a database, digital electronic circuitry, firmware, software, or any combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A method for simulating an actual object using a mockup object, the method comprising:
    storing the mockup object in a database, the mockup object including a node, the node being associated with a table, the table including a field having a proxy name and a pseudo name, the field being stored in the database using the pseudo name;
    storing a schema including actions that can be performed on the mockup object and statuses of the mockup object in which the actions are allowed to be performed on the mockup object;
    receiving an action to be performed on the mockup object, the action including the proxy name of the field, the received action being one of the actions in the schema;
    mapping the proxy name of the field included in the action to the corresponding pseudo name of the field;
    determining, using a processor, whether the action is allowed to be performed on the mockup object based on a status of the mockup object and the schema, the status of the mockup object being one of the statuses in the schema;
    when the action is allowed to be performed, performing the action on the mockup object stored in the database using the pseudo name of the field; and
    updating the status of the mockup object based on both the action performed and the schema.

2. The method of claim 1, wherein a condition is stored in the schema, and wherein the schema maps the statuses of the mockup object to the actions that can be performed on the mockup object.

3. The method of claim 2, wherein the condition specifies how the status of the mockup object must be set before the action can be performed on the mockup object.

4. The method of claim 1, further comprising:
    determining whether the mockup object exists prior to performing the action on the mockup object.

5. The method of claim 1, further comprising:
    implementing the mockup object as a mockup business object.

6. A system for simulating an actual object using a mockup object, the system comprising:
    a processor; and a database for storing the mockup object and a schema, the mockup object including a node, the node being associated with a table, the table including a field having a proxy name and a pseudo name, the field being stored in the database using the pseudo name, the schema including actions that can be performed on the mockup object and statuses of the mockup object in which the actions are allowed to be performed on the mockup object;

means for receiving an action to be performed on the mockup object, the action including the proxy name of the field, the received action being one of the action in the schema;

means for mapping the proxy name of the field included in the action to the corresponding pseudo name of the field;

means for determining whether the action is allowed to be performed on the mockup object based on a status of the mockup object and the schema, the status of the mockup object being one of the statuses in the schema;

means for performing, when the action is allowed to be performed, the action on the mockup object stored in the database using the pseudo name of the field; and means for updating the status of the mockup object based on both the action performed and the schema.

7. The system of claim 6, wherein a condition is stored in the schema, and wherein the schema maps the statuses of the mockup object to the actions that can be performed on the mockup object.

8. The system of claim 7, wherein the condition specifies how the status of the mockup object must be set before the action can be performed on the mockup object.

9. The system of claim 6, further comprising:
means for determining whether the mockup object exists prior to performing the action on the mockup object.

10. The system of claim 6, further comprising:
means for implementing the mockup object as a mockup business object.

11. A computer-readable storage medium containing instructions to configure a processor to perform a method for simulating an actual object using a mockup object, the method comprising:

storing the mockup object in a database, the mockup object including a node, the node being associated with a table, the table including a field having a proxy name and a pseudo name, the field being stored in the database using the pseudo name;

storing a schema including actions that can be performed on the mockup object and statuses of the mockup object in which the actions are allowed to be performed on the mockup object;

receiving an action to be performed on the mockup object, the action including the proxy name of the field, the received action being one of the actions in the schema;

mapping the proxy name of the field included in the action to the corresponding pseudo name of the field;

determining whether the action is allowed to be performed on the mockup object based on a status of the mockup object and the schema, the status of the mockup object being one of the statuses in the schema;

when the action is allowed to be performed, performing the action on the mockup object stored in the database using the pseudo name of the field; and updating the status of the mockup object based on both the action performed and the schema.

12. The computer-readable storage medium of claim 11, wherein a condition is stored in the schema, and wherein the schema maps the statuses of the mockup object to the actions that can be performed on the mockup object.

13. The computer-readable storage medium of claim 12, wherein the condition specifies how the status of the mockup object must be set before the action can be performed on the mockup object.

14. The computer-readable storage medium of claim 11, wherein the method further comprises:
determining whether the mockup object exists prior to performing the action on the mockup object.

15. The computer-readable storage medium of claim 11, wherein the method further comprises:
implementing the mockup object as a mockup business object.

* * * * *